(12) United States Patent
Xu et al.

(10) Patent No.: US 9,854,526 B2
(45) Date of Patent: Dec. 26, 2017

(54) SENSOR ACTIVATED POWER REDUCTION IN VOICE ACTIVATED MOBILE PLATFORM

(71) Applicant: QUALCOMM Incorporated, San Diego, CA (US)

(72) Inventors: Qing Xu, San Diego, CA (US); Carlos Manuel Puig, Santa Clara, CA (US); Shankar Sadasivam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 14/608,091

(22) Filed: Jan. 28, 2015

(65) Prior Publication Data
US 2016/0219524 A1    Jul. 28, 2016

(51) Int. Cl.
*H04M 1/00*    (2006.01)
*H04W 52/02*    (2009.01)

(52) U.S. Cl.
CPC ... *H04W 52/0251* (2013.01); *H04W 52/0254* (2013.01); *Y02B 60/50* (2013.01)

(58) Field of Classification Search
None
See application file for complete search history.

(56) References Cited

U.S. PATENT DOCUMENTS

| | | |
|---|---|---|
| 2007/0032225 A1 | 2/2007 | Konicek et al. |
| 2010/0313050 A1* | 12/2010 | Harrat ................ G06F 1/3203 713/323 |
| 2013/0124207 A1 | 5/2013 | Sarin et al. |
| 2014/0006830 A1 | 1/2014 | Kamhi et al. |
| 2014/0045547 A1 | 2/2014 | Singamsetty et al. |
| 2014/0074921 A1 | 3/2014 | Poornachandran et al. |
| 2014/0194102 A1* | 7/2014 | Strazisar ............ H04M 1/6008 455/418 |
| 2014/0334645 A1 | 11/2014 | Yun et al. |

FOREIGN PATENT DOCUMENTS

WO    0076177 A1    12/2000

OTHER PUBLICATIONS

International Search Report and Written Opinion—PCT/US2016/013096—ISA/EPO—dated Apr. 14, 2016, 11 pages.

* cited by examiner

*Primary Examiner* — Martin Mushambo
(74) *Attorney, Agent, or Firm* — Blakely, Sokoloff, Taylor & Zafman (57) ABSTRACT

A method of controlling power consumption of a voice activation system in a mobile platform includes monitoring one or more sensors of the mobile platform. Next, it is determined whether a microphone of the mobile platform is concealed or obstructed in response to the monitoring of the one or more sensors. If so, the mobile platform transitions one or more components of the voice activation system from a normal power consumption power state to a low power consumption state.

27 Claims, 6 Drawing Sheets

SENSOR ACTIVATED POWER REDUCTION IN VOICE ACTIVATED MOBILE PLATFORM

FIELD

This disclosure relates generally to power management in a mobile platform, and in particular but not exclusively, relates to the power management of a voice activated mobile platform.

BACKGROUND

An increasing number of mobile devices support one or more voice activation (VA) features. Often these VA features include the mobile device receiving a custom key word spoken by the user, where the mobile device then performs certain operations depending on the content of the keyword, e.g. wake up the device from sleep mode, launch an application, or make a phone call. However, the VA features must be running wherever and whenever the user wishes to issue a voice command, and the VA features thus constantly consume power. Furthermore, when the microphone of the device is concealed in a bag, pocket, purse, case, or belt holster, the poor voice quality is challenging for VA to work properly. Moreover, the rubbing of the pocket/bag/purse material creates noise, which may cause false triggering of VA and thus waste the limited power available to the mobile device.

SUMMARY

Accordingly, embodiments of the present disclosure provide for reduced power consumption of a mobile device by detecting the concealment and/or obstruction of the mobile device's microphone and then turning off the VA features either partially or completely while the microphone is concealed or obstructed.

For example, according to one aspect of the present disclosure, a method of controlling power consumption of a voice activation system in a mobile platform includes monitoring one or more sensors of the mobile platform. Next, it is determined whether a microphone of the mobile platform is concealed or obstructed in response to the monitoring of the one or more sensors. If so, the mobile platform transitions one or more components of the voice activation system from a normal power consumption power state to a low power consumption state.

According to another aspect of the present disclosure, a non-transitory computer-readable medium includes program code stored thereon for controlling power consumption of a voice activated system in a mobile platform. The program code includes instructions to monitor one or more sensors of the mobile platform, determine concealment or obstruction of a microphone of the mobile platform in response to the monitoring of the one or more sensors, and transition one or more components of the voice activation system from a normal power consumption power state to a low power consumption state in response to determining concealment or obstruction of the microphone.

In a further aspect of the present disclosure, a mobile platform includes a microphone, a voice activation system, a sensor system, memory, and a processing unit. The memory is adapted to store program code for controlling power consumption of the voice activation system and the processing unit is adapted to access and execute instructions included in the program code. When the instructions are executed by the processing unit, the processing unit directs the mobile platform to monitor the one or more sensors of the sensor system, determine concealment or obstruction of the microphone of the mobile platform in response to the monitoring of the one or more sensors, and transition one or more components of the voice activation system from a normal power consumption power state to a low power consumption state in response to determining concealment or obstruction of the microphone.

The above and other aspects, objects, and features of the present disclosure will become apparent from the following description of various embodiments, given in conjunction with the accompanying drawings.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Reference throughout this specification to "one embodiment", "an embodiment", one example", or an example" means that a particular feature, structure, or characteristic described in connection with the embodiment or example is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Any example or embodiment described herein is not to be construed as preferred or advantageous over other examples or embodiments.

Figure 1A:
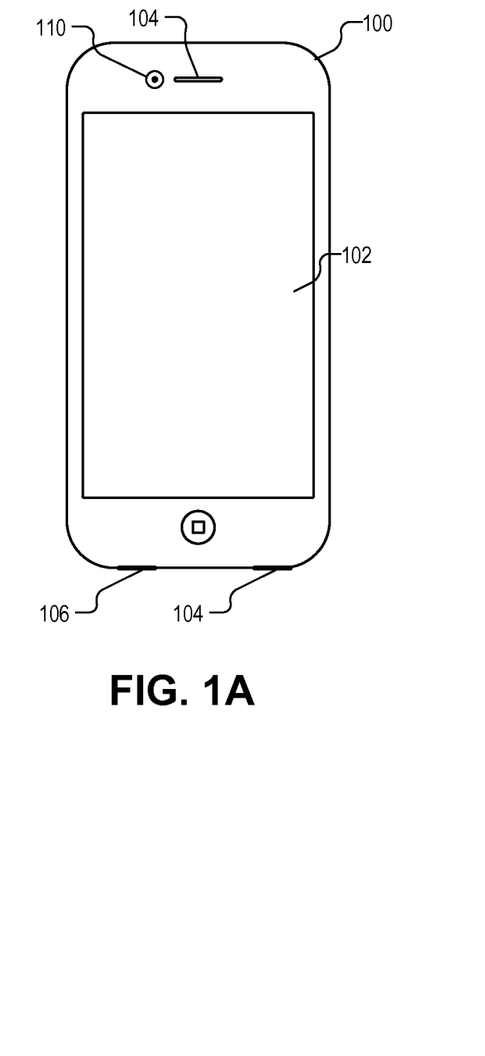
FIGS. 1A and 1B illustrate a front side and a backside, respectively, of a mobile platform that includes a voice activation system and that is configured to control power consumption of the voice activation system, in one embodiment.
Figure 1B:
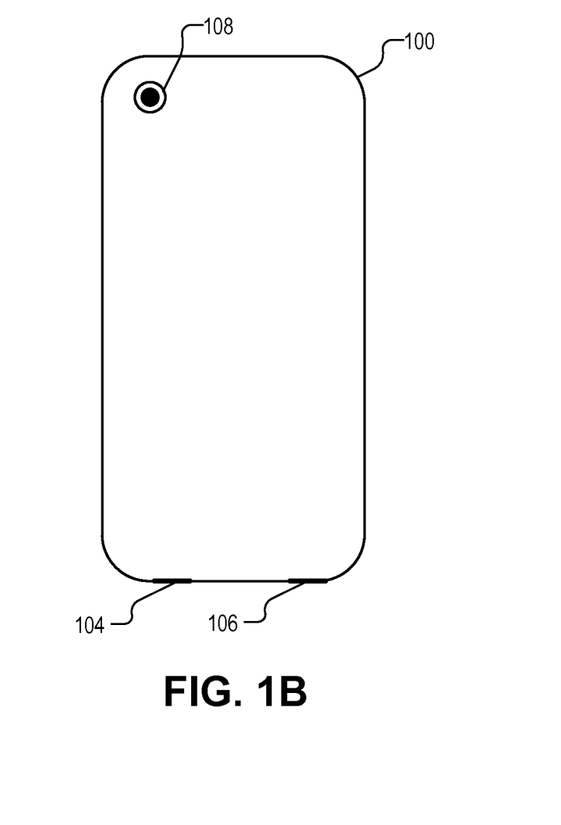

FIGS. 1A and 1B illustrate a front side and a backside, respectively, of a mobile platform 100 that includes a voice activation system and that is configured to control power consumption of the voice activation system. Mobile platform 100 is illustrated as including a display 102, speakers 104, and microphone 106. Mobile platform 100 may further include a rear-facing camera 108 and a front-facing camera 110 for capturing images of an environment. Mobile platform 100 may further include a sensor system (discussed infra) that includes sensors such as a proximity sensor, an accelerometer, a gyroscope, ambient light sensor, or the like, which may be used to assist in determining the position and/or relative motion of mobile platform 100.

As used herein, a mobile platform refers to any portable electronic device such as a cellular or other wireless communication device, personal communication system (PCS) device, personal navigation device (PND), Personal Information Manager (PIM), Personal Digital Assistant (PDA), or other suitable mobile device (e.g., wearable devices). Also, "mobile platform" is intended to include all electronic devices, including wireless communication devices, computers, laptops, tablet computers, smart watches, etc. which are capable of voice activation.

Figure 2:
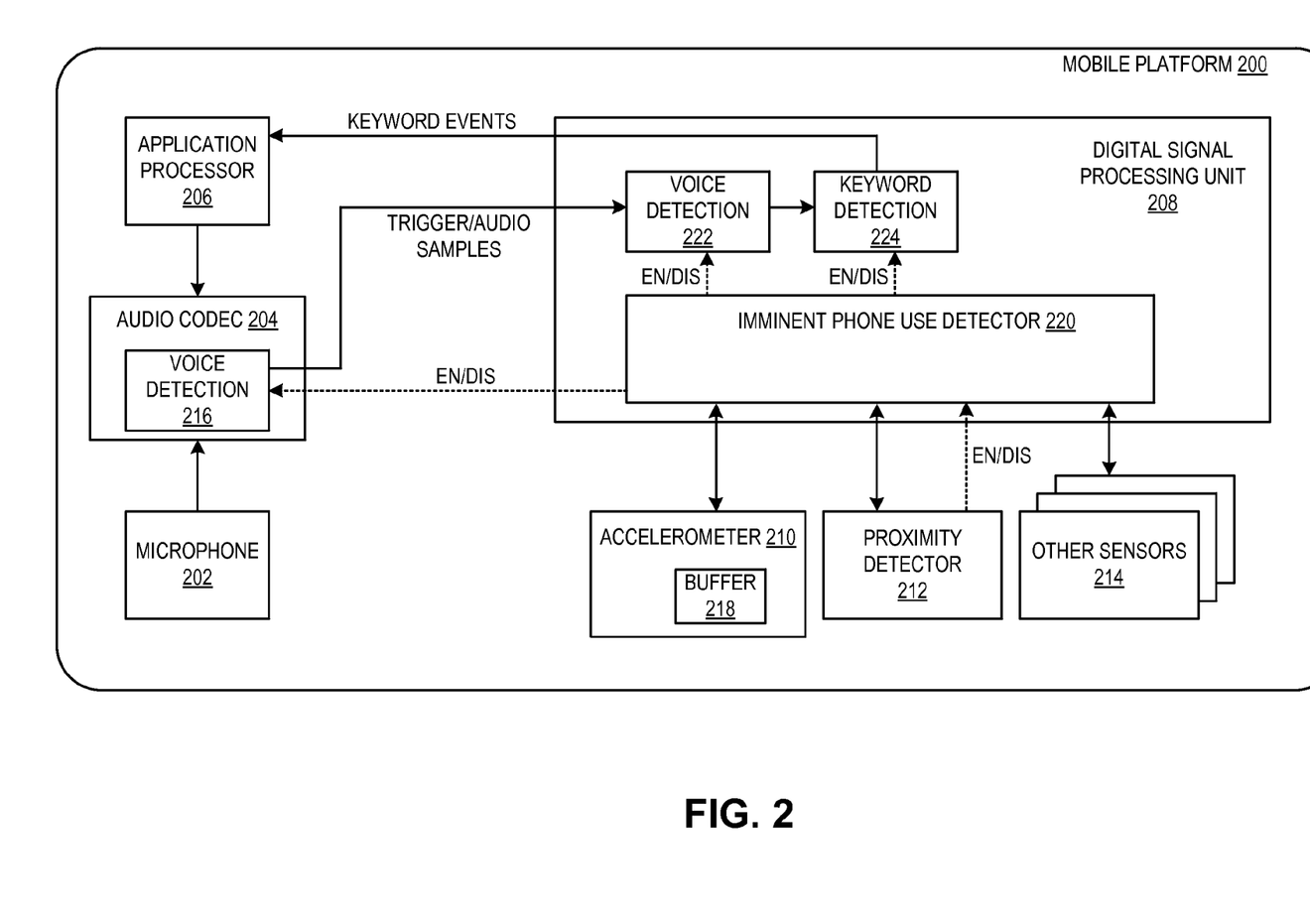
FIG. 2 is a functional block diagram of a possible implementation of the mobile platform of FIG. 1.

FIG. 2 is a functional block diagram of a mobile platform 200. Mobile platform 200 is one possible implementation of the mobile platform 100 of FIG. 1. The illustrated example of mobile platform 200 includes a microphone 202, an audio codec 204, an application processor 206, a digital signal processing (DSP) unit 208, an accelerometer 210, a proximity detector 212, and other sensors 214. Audio codec 204 is shown as including a hardware voice detection unit 216, while accelerometer 210 is shown as including a buffer 218. FIG. 2 shows DSP unit 208 as including an imminent phone use detector (IPUD) 220, a software voice detection unit 222, and a software keyword detection unit 224. In some embodiments, features or processes related to one or more of these before mentioned modules or units may be combined or separated into other configurations other than what is illustrated in the example of FIG. 2.

Mobile platform 200 includes a voice activation system that allows a user to control the device via voice commands. The voice activation system of mobile platform 200 includes the microphone 202, audio codec 204, DSP unit 208 and one or more applications running on application processor 206. As shown, audio codec 204 may include hardware voice detection unit 216 to perform initial voice detection. Upon the initial voice detection, audio codec 204 may generate a trigger to activate software voice detection unit 222 that is executed by DSP unit 208. The software keyword detection unit includes algorithms that then process the audio samples to determine what, if any keywords were spoken by the user. In a typical system, the voice activation system (microphone, audio codec, voice detection algorithms, keyword detection algorithms) are always on, consuming power. Embodiments of the present disclosure reduce the power consumed by the voice activation system by turning off one or more of the voice activation system components when the mobile device is in a condition that would result in voice detection being rendered difficult and/or unreliable (e.g., mobile device in a pocket or a bag). Accordingly, mobile platform 200 includes a sensor system that includes accelerometer 210, proximity detector 212, and other sensors 214, such as an ambient light sensor, a gyroscope, and a pressure sensor.

In one embodiment, mobile platform 200 (e.g., implemented by imminent phone use detector (IPUD) 220) may receive input from one or more sensors (e.g., accelerometer 210, proximity detector 212, and other sensors 214, such as an ambient light sensor, a gyroscope, and/or a pressure sensor) to determine whether mobile platform 200 is in one of several positional states. For example, using data collected from the sensor system, mobile platform 200 may determine that mobile platform 200 is in an ON_DESK state. The ON_DESK state includes mobile platform 200 being at an absolute rest, face-up or face-down, and tilted up to ±10 (ten) degrees from the horizontal plane. In another embodiment, mobile platform 200 may detect an IN_POCKET_BAG state when mobile platform 200 is in any position inside of a loose or tight pocket or bag-like enclosure, in any ambient condition, such as lighting, time of day, or temperature. Further positional states that are detectable by mobile platform 200 may include one or more PICKUP states (e.g., a PICKUP_FROM_DESK state or a PICKUP_FROM_POCKET/BAG state), based on data received from the sensor system. The PICKUP_FROM_DESK and PICKUP_FROM_POCKET/BAG states may be detected by mobile platform 200 for both left and right hand pickups when mobile platform 200 is detected to no longer be in the ON_DESK or IN_POCKET_BAG states, respectively. Further positional states may include a FACING state and an UNKNOWN state. The FACING state is detected by mobile platform 200 only when there is a pick-up action within a recent time period (e.g., 5 seconds).

In operation, mobile platform 200 may monitor the sensor system and then generate one or more disable signals in response to determining a transition of mobile platform 200 to the IN_POCKET_BAG state. In one embodiment, mobile platform 200 utilizes disable signals to put one or more of the voice activation system components into a lower power consumption or disabled state. For example, mobile platform 200 may disable the hardware voice detection unit 216 in audio codec 204, and both the software voice detection unit 222 and the software keyword detection unit 224 running on DSP unit 208. In another embodiment, mobile platform 200 may disable only the software voice detection and software keyword detection units running on the DSP unit 208 while allowing the hardware voice detection unit 216 of the audio codec 204 to remain on. Subsequently, upon determining a transition to one of the PICKUP states, mobile platform 200 may then generate enable signals to turn on (i.e., restore to normal power consumption state) all of the previously disabled components of the voice activation system.

In some embodiments, IPUD 220, implemented as an engine or module, contains the logic or features described above to enable and disable specific hardware and software features of mobile platform 200 according to states determined from the mobile platform 200 sensors. Mobile platform 200's IPUD 220 may be communicatively coupled to voice detection 216, voice detection 222, keyword detection 224, and one or more sensors (e.g., accelerometer 210, proximity detector 212, and other sensors 214), and may receive sensor data and send disable signals as illustrated in FIG. 2.

Figure 3:
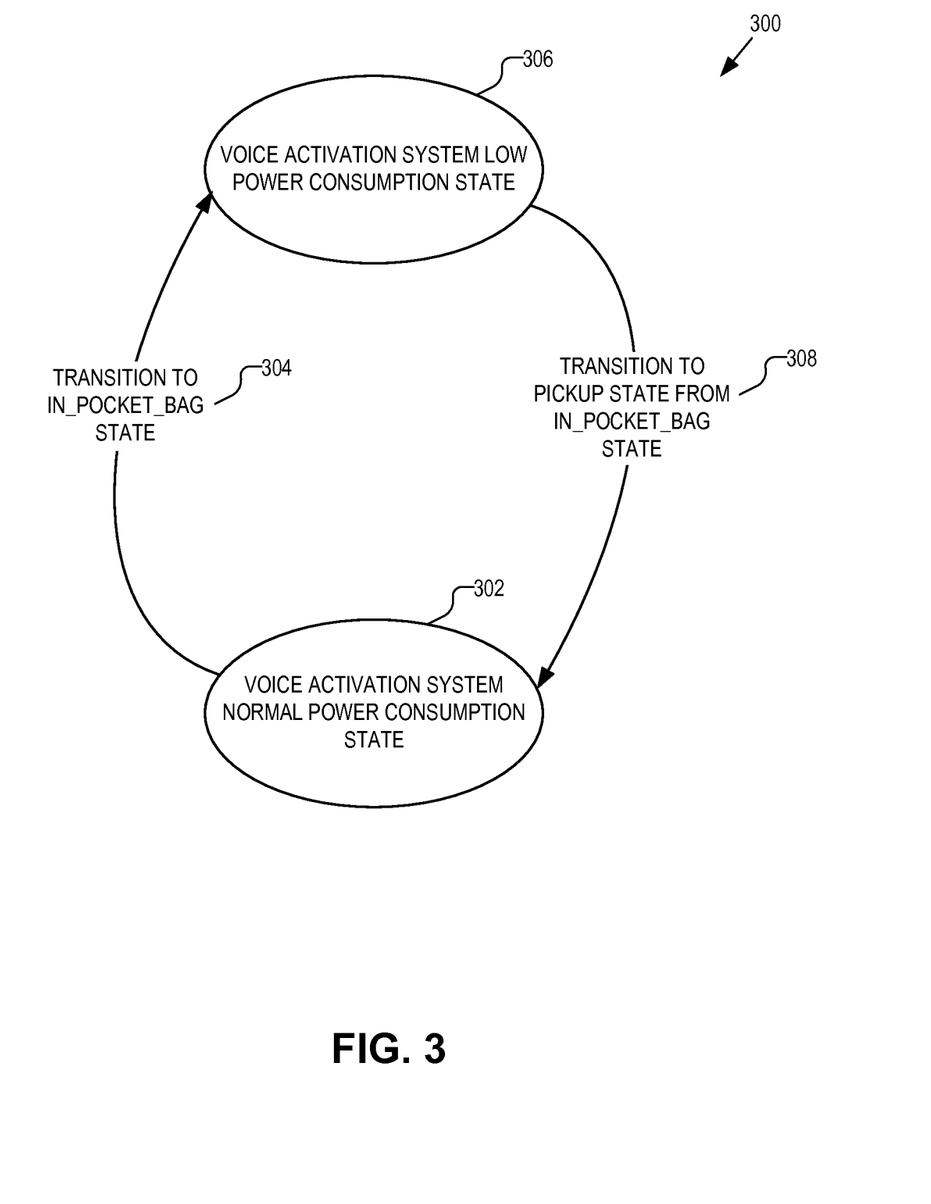
FIG. 3 is a state diagram illustrating the transition of a voice activation system between a low power consumption state and a normal power consumption state.

FIG. 3 is a state diagram 300 illustrating the transition of a voice activation system of a mobile platform (e.g., mobile platform 200) between a low power consumption state and a normal power consumption state. When the voice activation system of a mobile platform is in the normal power consumption state 302, the voice activation system performs the voice activation features as described above. That is, the voice activation system may monitor incoming audio from the mobile platform microphone and process the received audio samples for possible keyword commands spoken by a user. These keyword commands may then be passed on to a voice activation application running on the mobile platform's application processor (e.g., application processor 206).

However, when the mobile platform 200 detects a transition to the IN_POCKET_BAG positional state 304, mobile platform 200 puts one or more components of the voice activation system into the low power consumption state. Since mobile platform 200 is in the IN_POCKET_BAG positional state this often correlates to the microphone of the mobile platform being concealed or obstructed such that the voice activation system may not function properly. Thus, with one or more components of the voice activation system in the low power consumption state, the voice activation system will not perform the voice activation features described above. That is, while in the low power consumption state the voice activation system may not monitor incoming audio from mobile platform 200 microphone and may also not process audio received from the microphone.

Subsequently, when mobile platform 200 determines that mobile platform 200 is no longer in the IN_POCKET_BAG positional state, such as the case with a transition to the PICKUP state 308, mobile platform 200 may then activate the components of the voice activation system back to the normal power consumption state 302 to restore operation of the voice activation system.

Figure 4A:
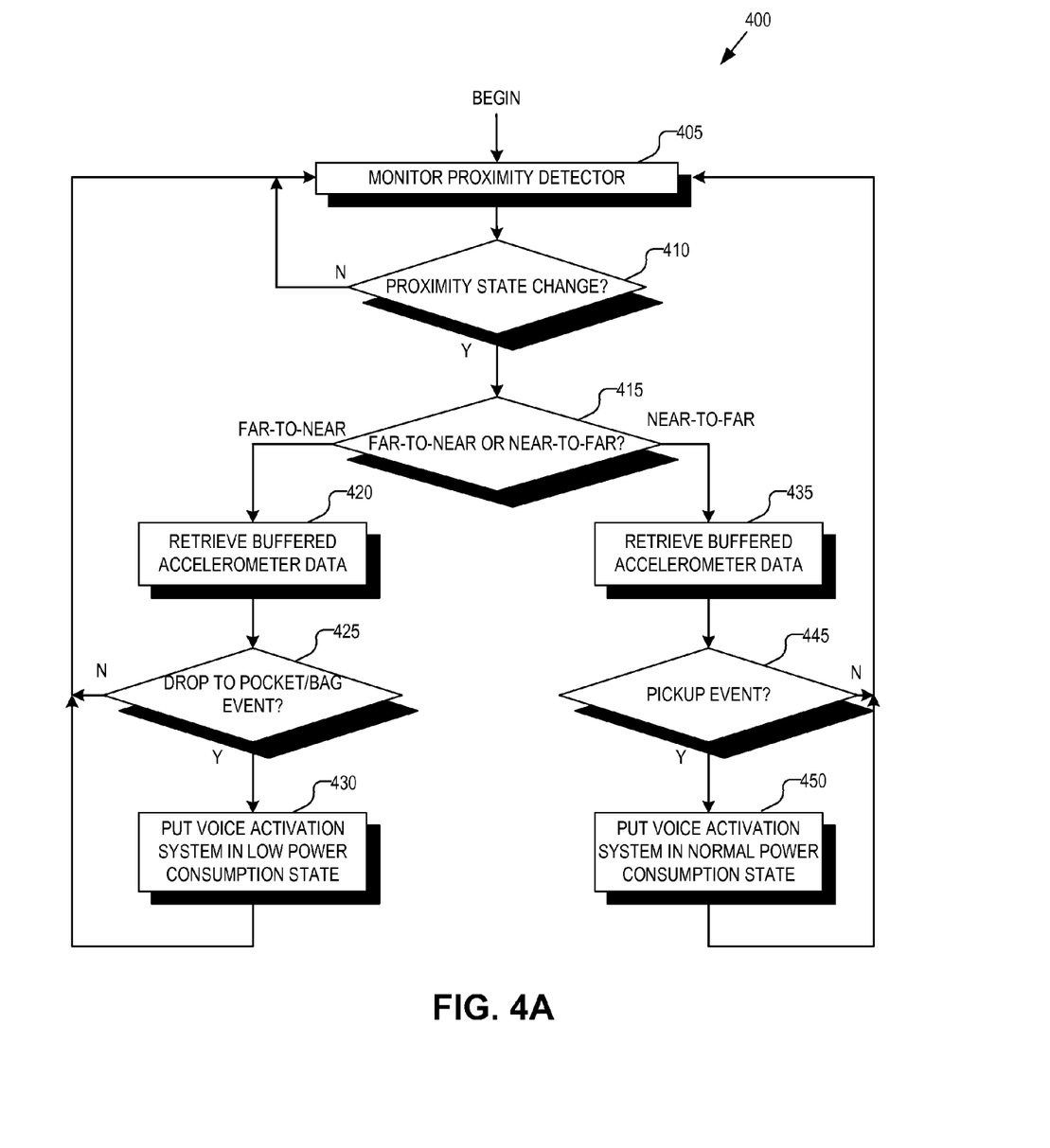
FIG. 4A is a flowchart illustrating a process of controlling power consumption of a voice activation system in a mobile platform, in one embodiment.

FIG. 4A is a flowchart illustrating a process 400 of controlling power consumption of a voice activation system in a mobile platform, in one embodiment. Process 400 is one possible operation of a mobile platform with the features described in FIG. 2. Thus, process 400 will be described with reference to FIGS. 2 and 4A.

Process 400 begins at process block 405 with the monitoring of proximity detector 212. Thus, in this example, the proximity detector 212 may be in an always-on power state to continuously collect proximity data. In one embodiment, monitoring proximity detector 212 includes mobile platform 200 (e.g., IPUD 220) actively and periodically retrieving proximity data from proximity detector 212. In another embodiment, mobile platform 200 or one or more components of mobile platform 200 (e.g., IPUD 220) may enter a sleep state (e.g., low power consumption state) until the proximity detector 212 detects a proximity state change (e.g., FAR-TO-NEAR, NEAR-TO-FAR, etc.) and then generates an enable (e.g., trigger) signal to wake-up the one or more components of mobile platform 200.

Upon detecting a proximity state change in decision block 410, mobile platform 200 then determines (i.e., decision block 415) whether the proximity state change was a FAR-TO-NEAR or a NEAR-TO-FAR proximity state change. If the proximity state change was a FAR-TO-NEAR proximity state change then process 400 proceeds to process block 420, where mobile platform 200 retrieves accelerometer data from accelerometer 210. In one example, the accelerometer 210 is in an always-on state to continuously collect accelerometer data. However, in another example, accelerometer may enter a low power consumption state when accelerometer data is not needed, where accelerometer 210 is turned on to a normal power consumption state in response to the proximity detector 212 detecting a proximity state change. Thus, accelerometer 210 may include an "on-only-when-needed" mode, that may further reduce power consumption of mobile platform 200.

In one embodiment, the accelerometer data retrieved from accelerometer 210 is accelerometer data from a time window around the transition to the FAR-TO-NEAR proximity state. For example, accelerometer 210 may include a buffer 218 to store recent accelerometer data. In some embodiments, the amount of sensor data to store may be configurable according to a threshold. In one embodiment, buffer 218 is a first-in-first-out (FIFO) buffer capable of storing a threshold of about 200 milliseconds to about 500 milliseconds of accelerometer data immediately preceding a proximity state change event. In other embodiments, the threshold may be larger or smaller than the example above.

Next, in decision block 425, mobile platform 200 determines, based on data received from proximity detector 212 and accelerometer 210, whether the mobile platform 200 has changed positional states to the IN_POCKET_BAG state. If not, process 400 returns to process block 405 to again monitor the proximity detector 212. If however, decision block 425 does indeed determine that the mobile platform 200 is now in the IN_POCKET_BAG state, then mobile platform 200 may put one or more components of the voice activation system (e.g., hardware voice detection unit 216, software voice detection unit 222, and software keyword detection unit 224) into the low power consumption state. After entering the low power consumption state in process block 430, process 400 returns back to monitoring the proximity detector in process block 405.

Returning now to decision block 415, if mobile platform 200 determines that the detected proximity state change was a NEAR-TO-FAR proximity state change the process 400 the proceeds to process block 435, where recent accelerometer data is retrieved from buffer 218. Based on the NEAR-TO_FAR proximity state change and on the accelerometer data retrieved from buffer 218, mobile platform 200 then determines in decision block 445 whether the mobile platform 200 has transitioned to the PICKUP positional state. If not, the process 400 returns to process block 405. If, however, mobile platform 200 does indeed determine that the mobile platform 200 has transitioned to the PICKUP positional state then process proceeds to process block 450 where mobile platform 200 puts the voice activation system into the normal power consumption state. Putting the voice activation system into the normal power consumption state may include generating enable signals to turn on all components of the voice activation systems, provided there were not already on.

Figure 4B:
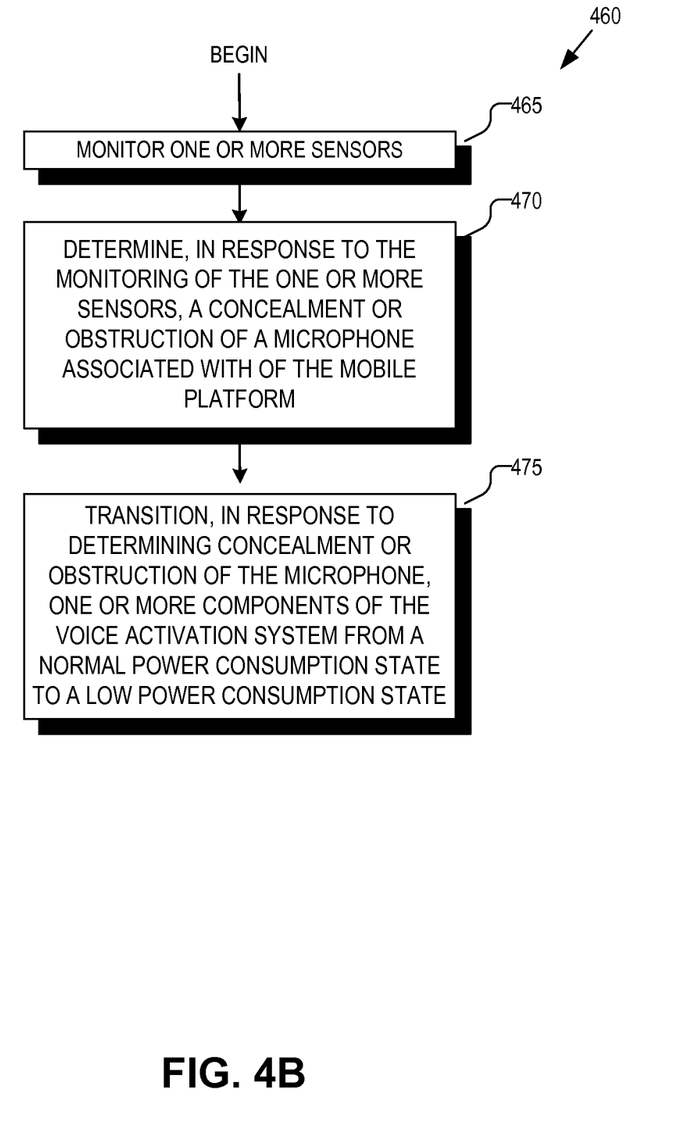
FIG. 4B is a flowchart illustrating a process of controlling power consumption of a voice activation system in a mobile platform, in another embodiment.

FIG. 4B is a flowchart illustrating a process 460 of controlling power consumption of a voice activation system in a mobile platform, in one embodiment. At block 465, the embodiment monitors one or more sensors of the mobile platform. The one or more sensors may include a proximity detector, accelerometer, or other sensors useful to determining state of the mobile platform.

At block 470, the embodiment determines, in response to the monitoring of the one or more sensors, a concealment or obstruction of a microphone associated with of the mobile platform. In one embodiment, determining concealment or obstruction of the microphone includes detecting a proximity state change of the mobile platform. Proximity state changes may include near-to-far (e.g., removal of obstruction) and far-to-near (e.g., arrival of an obstruction) state changes determined from proximity sensor data. In one embodiment, determining concealment or obstruction of the microphone includes retrieving accelerometer data within a time window that includes one or more of a period of time before or a period of time after the proximity state change of the mobile platform. The mobile platform may include a buffer to store at least some accelerometer data, where retrieving accelerometer data from the accelerometer includes retrieving accelerometer data from the buffer corresponding to a time immediately preceding the proximity state change.

At block 475, the embodiment transitions, in response to determining concealment or obstruction of the microphone, one or more components of the voice activation system from a normal power consumption state to a low power consumption state. In some embodiments, the proximity detector and the accelerometer are in an always-on power state to continuously collect proximity and accelerometer data. For example, the proximity detector may be in an always-on power state to continuously collect proximity data and the accelerometer may be configured to transition from the low power consumption state to the normal power consumption state in response to the proximity detector detecting the proximity state change.

In some embodiments, transitioning one or more components of the voice activation system to the low power consumption state includes disabling the one or more components. For example, the components may include a hardware voice detection unit, a software voice detection unit, a software keyword detection unit, or any combination thereof and transitioning may include disabling (or otherwise reducing power provided to) the hardware voice detection unit, the software voice detection unit, and the software keyword detection unit. In some embodiments, one or more of the components is in a normal power state while one or more other components are transitioned to a low power consumption. For example, transitioning the one or more components to the low power consumption state may include disabling the software voice detection unit and the software keyword detection unit, while leaving the hardware voice detection unit in a normal power consumption state.

In some embodiments, the mobile platform continues to monitor the one or more sensors of the mobile platform after transitioning the one or more components of the voice activation system to the low power consumption state. The mobile platform may determine whether the microphone of the mobile platform is no longer concealed or obstructed in response to the continual monitoring of the one or more sensors and transition the one or more components of the voice activation system from the low power consumption state to the normal power consumption state in response to determining that the microphone is no longer concealed or obstructed.

Figure 5:
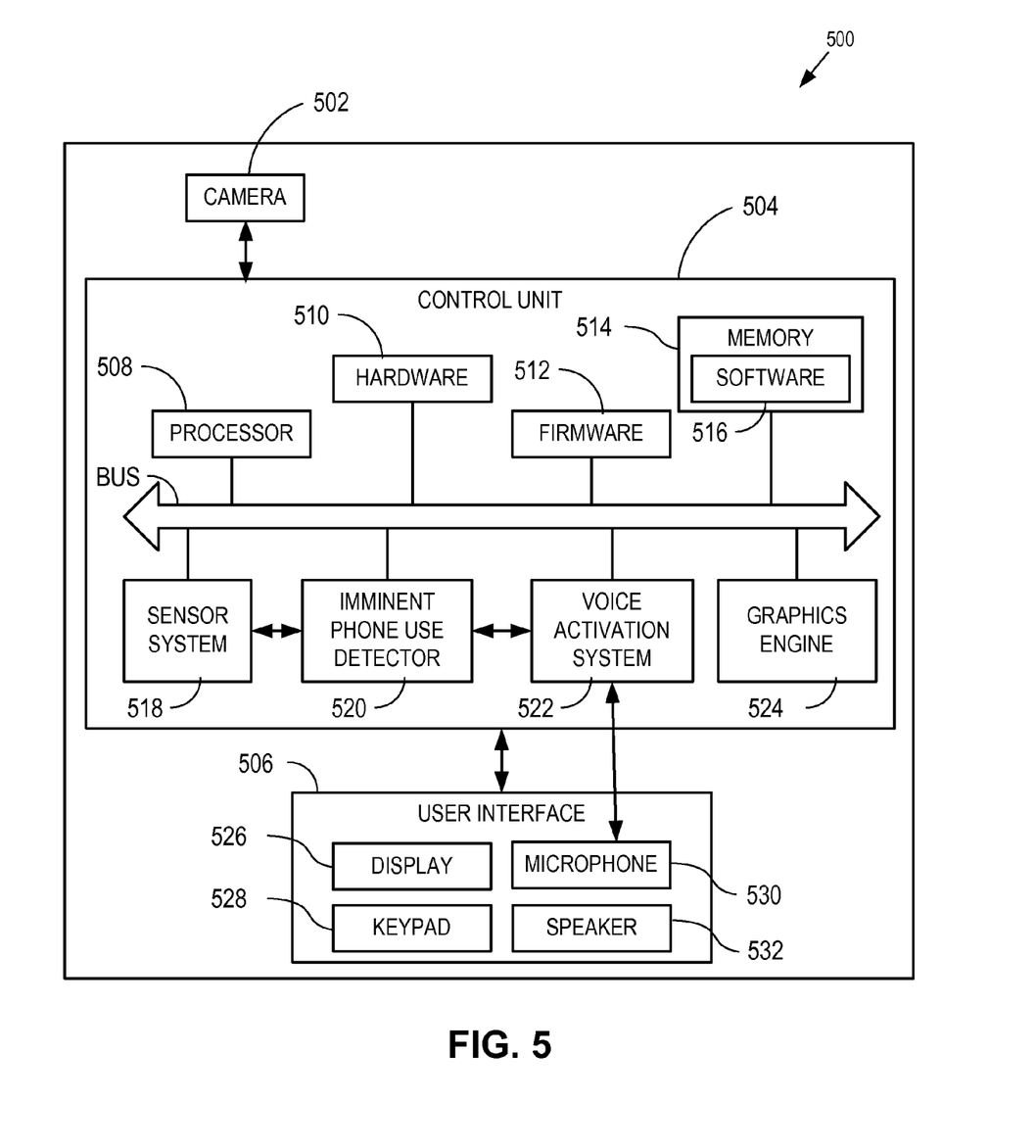
FIG. 5 is a functional block diagram illustrating an exemplary mobile platform capable of controlling power consumption of a voice activation system.

FIG. 5 is a functional block diagram illustrating a mobile platform 500 capable of controlling power consumption of a voice activation system 522. Mobile platform 500 is one possible implementation of mobile platform 100 of FIGS. 1A and 1B, and mobile platform 200 of FIG. 2. Mobile platform 500 includes a camera 502 as well as a user interface 506 that includes the display 526 capable of displaying images captured by the camera 502. User interface 506 may also include a keypad 528 or other input device through which the user can input information into the mobile platform 500. If desired, the keypad 528 may be obviated by integrating a virtual keypad into the display 526 with a touch sensor. User interface 506 may also include a microphone 530 and speaker 532, e.g., if the mobile platform is a cellular telephone.

Mobile platform 500 includes a sensor system 518 that includes sensors such as a proximity detector, accelerometers, magnetometer, gyroscopes, or other similar motion sensing elements. Of course, mobile platform 500 may include other elements unrelated to the present disclosure, such as a wireless transceiver.

Mobile platform 500 also includes a control unit 504 that is connected to and communicates with the camera 502 and user interface 506, along with other features, such as the sensor system 518, the imminent phone use detector (IPUD) 520 and the voice activation system 522. The voice activation system 522 accepts and processes data from microphone 530 and controls the mobile platform 500 in response, as discussed above. Control unit 504 may be provided by a processor 508 and associated memory 514, hardware 510, software 516, and firmware 512.

Control unit 504 also includes IPUD 520 for performing the power consumption control process 400 described above. Control unit 504 may further include a graphics engine 524, which may be, e.g., a gaming engine, to render desired data in the display 526, if desired. IPUD 520 and voice activation system 522 are illustrated separately and separate from processor 508 for clarity, but may be a single unit and/or implemented in the processor 508 based on instructions in the software 516 which is run in the processor 508. Processor 508, as well as one or more of the IPUD 520, the voice activation system 522, and graphics engine 524 can, but need not necessarily include, one or more microprocessors, embedded processors, controllers, application specific integrated circuits (ASICs), advanced digital signal processors (ADSPs), and the like. The term processor describes the functions implemented by the system rather than specific hardware. Moreover, as used herein the term "memory" refers to any type of computer storage medium, including long term, short term, or other memory associated with mobile platform 500, and is not to be limited to any particular type of memory or number of memories, or type of media upon which memory is stored.

The processes described herein (e.g., the methods of FIG. 4A and FIG. 4B) may be implemented by various means depending upon the application. For example, these processes may be implemented in hardware 510, firmware 512, software 516, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein (e.g., the methods of FIG. 4A and FIG. 4B). Any computer-readable medium tangibly embodying instructions may be used in implementing the processes described herein. For example, program code may be stored in memory 514 and executed by the processor 508. Memory 514 may be implemented within or external to the processor 508.

If implemented in firmware and/or software, the functions (e.g., the methods of FIG. 4A and FIG. 4B) may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The order in which some or all of the process blocks appear in each process discussed above should not be deemed limiting. Rather, one of ordinary skill in the art having the benefit of the present disclosure will understand that some of the process blocks may be executed in a variety of orders not illustrated.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Various modifications to the embodiments disclosed herein will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of controlling power consumption of a voice activation system in a mobile platform, the method comprising:
    monitoring one or more sensors of the mobile platform;
    determining concealment or obstruction of a microphone of the mobile platform in response to the monitoring of the one or more sensors; and
    transitioning a first component of the voice activation system from a normal power consumption state to a low power consumption state in response to determining concealment or obstruction of the microphone while a second component of the voice activation system remains in a normal power consumption state, and wherein the voice activation system allows a user to control the mobile platform via voice commands.

2. The method of claim 1, wherein the one or more sensors includes a proximity detector, and wherein determining concealment or obstruction of the microphone includes detecting a proximity state change of the mobile platform.

3. The method of claim 2, wherein the one or more sensors further includes an accelerometer, and wherein determining concealment or obstruction of the microphone includes retrieving accelerometer data within a time window that includes one or more of a period of time before or a period of time after the proximity state change of the mobile platform.

4. The method of claim 3, wherein the mobile platform further comprises a buffer to store at least some accelerometer data, and wherein retrieving accelerometer data from the accelerometer includes retrieving accelerometer data from the buffer corresponding to a time immediately preceding the proximity state change.

5. The method of claim 3, wherein the proximity detector and the accelerometer are in an always-on power state to continuously collect proximity and accelerometer data.

6. The method of claim 3, wherein the proximity detector is in an always-on power state to continuously collect proximity data and wherein the accelerometer is configured to transition from the low power consumption state to the normal power consumption state in response to the proximity detector detecting the proximity state change.

7. The method of claim 1, wherein transitioning the first component of the voice activation system to the low power consumption state includes disabling the first component.

8. The method of claim 1, wherein the first component includes a hardware voice detection unit, a software voice detection unit, a software keyword detection unit, or any combination thereof.

9. The method of claim 1, further comprising:
    continuing to monitor the one or more sensors of the mobile platform after transitioning the first component of the voice activation system to the low power consumption state;
    determining whether the microphone of the mobile platform is no longer concealed or obstructed in response to the continual monitoring of the one or more sensors; and
    transitioning the first component of the voice activation system from the low power consumption state to the normal power consumption state in response to determining that the microphone is no longer concealed or obstructed.

10. A non-transitory computer-readable medium including program code stored thereon for controlling power consumption of a voice activated system in a mobile platform, the program code comprising instructions to:
    monitor one or more sensors of the mobile platform;
    determine concealment or obstruction of a microphone of the mobile platform in response to the monitoring of the one or more sensors; and
    transition a first component of the voice activation system from a normal power consumption state to a low power consumption state in response to determining concealment or obstruction of the microphone while a second component of the voice activation system remains in a normal power consumption state, and wherein the voice activation system allows a user to control the mobile platform via voice commands.

11. The medium of claim 10, wherein the one or more sensors includes a proximity detector, and wherein the instructions to determine concealment or obstruction of the microphone includes instructions to detect a proximity state change of the mobile platform.

12. The medium of claim 11, wherein the one or more sensors further includes an accelerometer, and wherein determining concealment or obstruction of the microphone includes retrieving accelerometer data within a time window that includes one or more of a period of time before or a period of time after the proximity state change of the mobile platform.

13. The medium of claim 12, wherein the mobile platform further comprises a buffer to store at least some accelerometer data, and wherein the instructions to retrieve accelerometer data from the accelerometer includes instructions to retrieve accelerometer data from the buffer corresponding to a time immediately preceding the proximity state change.

14. The medium of claim 12, wherein the proximity detector and the accelerometer are in an always-on power state to continuously collect proximity and accelerometer data.

15. The medium of claim 12, wherein the proximity detector is in an always-on power state to continuously collect proximity data and wherein the accelerometer is configured to transition from the low power consumption state to the normal power consumption state in response to the proximity detector detecting the proximity state change.

16. The medium of claim 10, wherein the instructions to transition the first component of the voice activation system to the low power consumption state includes instructions to disable the first component.

17. The medium of claim 10, further comprising instructions to:
continue monitoring the one or more sensors of the mobile platform after transitioning the first component of the voice activation system to the low power consumption state;
determine whether the microphone of the mobile platform is no longer concealed or obstructed in response to the continual monitoring of the one or more sensors; and
transition the first component of the voice activation system from the low power consumption state to the normal power consumption state in response to determining that the microphone is no longer concealed or obstructed.

18. A mobile platform, comprising:
a voice activation system coupled to the microphone to enable a user to control the mobile platform via voice commands;
a sensor system including one or more sensors;
memory adapted to store program code for controlling power consumption of the voice activation system; and
a processing unit adapted to access and execute instructions included in the program code, wherein when the instructions are executed by the processing unit, the processing unit directs the mobile platform to:
monitor the one or more sensors of the sensor system;
determine concealment or obstruction of a microphone of the mobile platform in response to the monitoring of the one or more sensors; and
transition a first component of the voice activation system from a normal power consumption state to a low power consumption state in response to determining concealment or obstruction of the microphone while a second component of the voice activation system remains in a normal power consumption state, and wherein the voice activation system allows a user to control the mobile platform via voice commands.

19. The mobile platform of claim 18, wherein the one or more sensors includes a proximity detector, and wherein the instructions to direct the mobile platform to determine concealment or obstruction of the microphone includes instructions to detect a proximity state change of the mobile platform.

20. The mobile platform of claim 19, wherein the one or more sensors further includes an accelerometer, and wherein determining concealment or obstruction of the microphone includes retrieving accelerometer data within a time window that includes one or more of a period of time before or a period of time after the proximity state change of the mobile platform.

21. The mobile platform of claim 20, wherein the mobile platform further comprises a buffer coupled to the accelerometer to store at least some of the accelerometer data, and wherein the instructions to retrieve accelerometer data from the accelerometer includes instructions to retrieve accelerometer data from the buffer corresponding to a time immediately preceding the proximity state change.

22. The mobile platform of claim 20, wherein the proximity detector and the accelerometer are in an always-on power state to continuously collect proximity and accelerometer data.

23. The mobile platform of claim 20, wherein the proximity detector is in an always-on power state to continuously collect proximity data and wherein the accelerometer is configured to transition from the low power consumption state to the normal power consumption state in response to the proximity detector detecting the proximity state change.

24. The mobile platform of claim 18, wherein the instructions to transition the first component of the voice activation system to the low power consumption state includes instructions to disable the first component.

25. The mobile platform of claim 18, wherein the first component includes a hardware voice detection unit, a software voice detection unit, a software keyword detection unit, or any combination thereof.

26. The mobile platform of claim 18, wherein the program code further comprises instructions to:
continue monitoring the one or more sensors of the mobile platform after transitioning the first component of the voice activation system to the low power consumption state;
determine whether the microphone of the mobile platform is no longer concealed or obstructed in response to the continual monitoring of the one or more sensors; and
transition the first component of the voice activation system from the low power consumption state to the normal power consumption state in response to determining that the microphone is no longer concealed or obstructed.

27. The mobile platform of claim 18, wherein the voice activation system includes:
an audio codec having a hardware voice detection component coupled to the microphone and configured to perform initial voice detection; and
a digital signal processing unit having a software voice detection component and a software keyword detection component, the software voice detection component coupled to receive audio samples from the hardware voice detection component and configured to perform voice detection, the software keyword detection component coupled to the software voice detection component to determine whether any voice commands were spoken by the user.

* * * * *